June 24, 1941.   L. VORHIES   2,246,706
AIRPLANE PROPELLER
Filed July 3, 1939
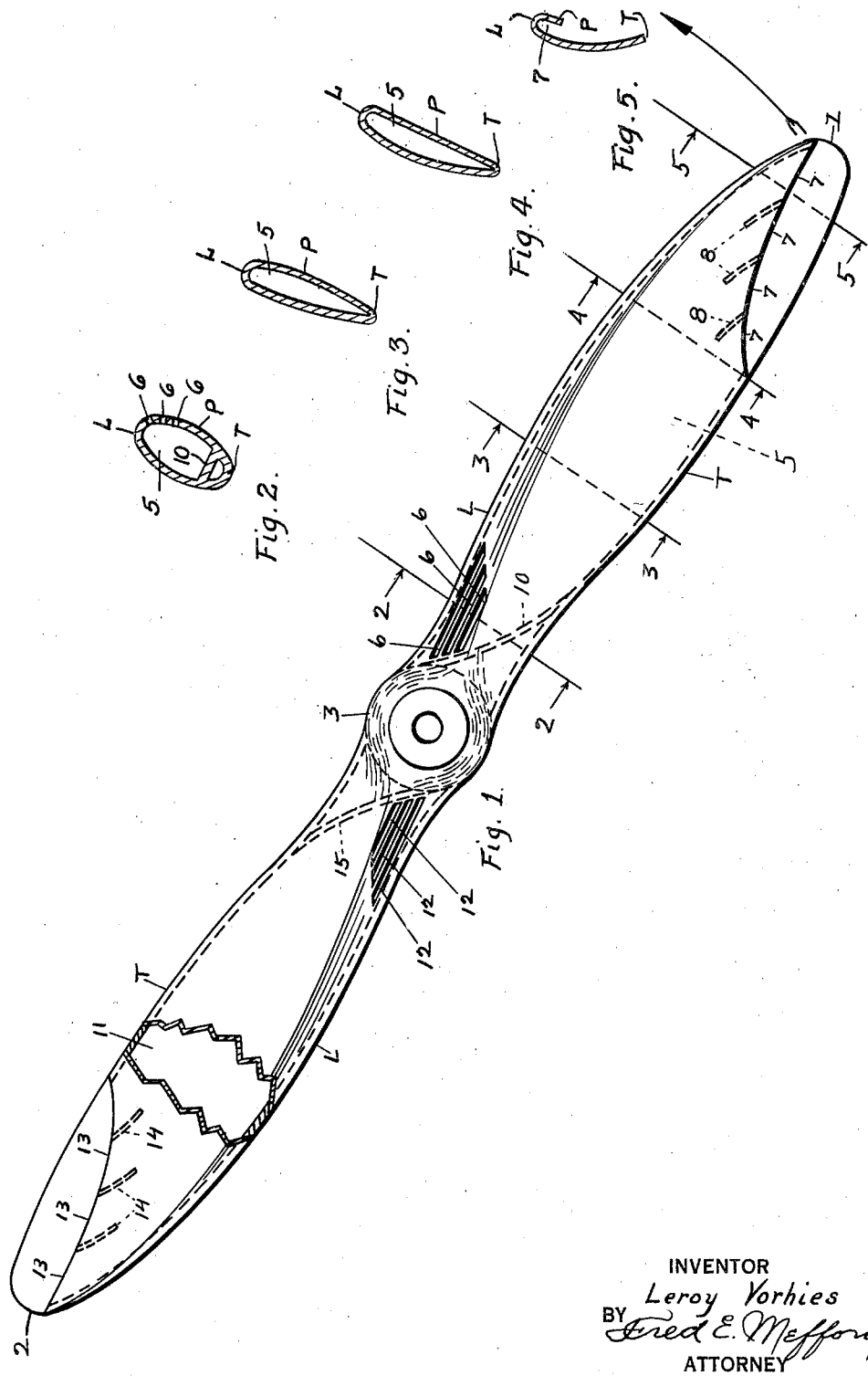
INVENTOR
Leroy Vorhies
BY Fred E. Mefford
ATTORNEY Patented June 24, 1941

2,246,706

UNITED STATES PATENT OFFICE 2,246,706

AIRPLANE PROPELLER

Leroy Vorhies, Granite, Colo.

Application July 3, 1939, Serial No. 282,714

3 Claims. (Cl. 170—172)

My invention relates to propellers for airplanes and my object is to provide a propeller of this class having means and facilities whereby air is drawn into a blade near the hub and discharged across the tip. Other objects will appear as the description progresses.

Figure 1 represents a rear view of a propeller in the direction indicated by the arrow; Fig. 2, a section on the line 2—2 in Fig. 1; Fig. 3, a section on the line 3—3; Fig. 4, a section on the line 4—4; and Fig. 5, a section on line 5—5.

Although I show the preferred embodiment of my invention, I do not thereby limit myself to the precise form shown, but wish it understood that within the scope of what hereinafter is claimed, various changes in the details of construction may be made without departing from the spirit of the invention.

The blade 1 is provided with an air duct 5 extending longitudinally therein. Inlet slots 6 are located adjacent to the hub 3 on the pressure face P near the leading edge L of the blade and communicate with the duct 5. A portion of the pressure face side P of the blade is cut away diagonally on a line extending from the leading edge near the tip to the trailing edge to provide a diagonal outlet 7 from the duct 5, as shown in Figs. 1, 4 and 5. Deflecting baffles 8 are disposed obliquely within the duct 5 at the outlet 7 so as to deflect the discharging current of air obliquely across the tip of the blade towards the trailing edge T. A wall 10 is provided near the inlets 6 to streamline the air current passing through the duct 5.

The blade 2 is provided with an air duct 11, inlets 12, outlets 13, deflecting baffles 14, and a wall 15.

As the propeller is revolved anti-clockwise in flight, air is drawn into the duct 5 through the inlet slots 6, passed through the duct 5 and discharged through the outlets 7, the action being accomplished by centrifugal force. The air thus drawn into and through the duct 5, relieves the frontal air resistance near the hub, and as the current of air is discharged near the tip, the discharging air current affords added air for the tip to act against, thereby increasing forward propulsion.

Although I show a propeller with two fixed blades, I contemplate using the blade or blades on various kinds of hubs, fixed or variable pitch, constant speed and other kinds. The blades may be shaped for either clockwise or anti-clockwise rotation.

I claim:

1. An airplane propeller blade adapted to be mounted on a hub, said blade including a longitudinally disposed air duct therein; an outlet and inlets communicating with said duct; the outlet being provided by cutting away a portion of the pressure face on a line extending from the leading edge near the tip diagonally to the trailing edge of the blade; deflecting baffles mounted in said duct at said outlet; the inlets being located adjacent to the leading edge on the pressure face of the blade at the opposite end from the tip.

2. An airplane propeller comprising a hub and a plurality of blades extending radially therefrom, each blade being provided with a longitudinally disposed air duct therein, a portion of the pressure face side of each blade being cut away diagonally on a line extending from the leading edge near the tip to the trailing edge whereby an oblique air outlet for said duct is provided; a series of deflecting baffles disposed obliquely in said air duct at said outlet; and a series of inlets communicating with said duct and located near the hub adjacent to the leading edge on the pressure face of the blade.

3. An airplane propeller blade having an air duct running longitudinally therein, the wall of said duct adjacent to the trailing edge of the blade being curved to streamline the air currents passing through said duct from the inlets to the outlet; a portion of the pressure face of the blade being cut away diagonally on a line extending from the leading edge near the tip to the trailing edge to provide an oblique outlet, a series of baffles in said outlet at the proper angles to deflect the air currents obliquely across the normal portion of the tip; and the inlets being located near the leading edge on the pressure face at the opposite end from the tip of said blade.

LEROY VORHIES.